Nov. 11, 1958     J. JAUQUET     2,859,974
POCKET SPEAKING DEVICES
Filed Aug. 18, 1953

INVENTOR:
JEAN JAUQUET
BY:

2,859,974

POCKET SPEAKING DEVICES

Jean Jauquet, Mexico City, Mexico

Application August 18, 1953, Serial No. 374,884

4 Claims. (Cl. 274—16)

The present invention is related to advertising devices for purposes of publicity, especially audible or sounding, and most particularly it refers to certain useful improvements in sounding cards or letters which by means of the rotation of an engraved disc audibly transmit an advertising, greeting, childs story, educational or instructive material, religious music, a prayer or a congratulatory message, or the like.

The sounding board of the invention consists of a base of cardboard, pasteboard, plastic material or any other that is found convenient, provided at the center with a bend so that two wings or equal portions are formed and which are susceptible of folding flat together or being placed at an angle; a third wing being disposed in upstanding, operative position over one of the first mentioned so that the first mentioned portions are maintained in position by means of an elastic or something similar that exerts pressure against them. Over the horizontal portion or that which serves as a base, mounted by means of an eyelet and a swivel or whatever permits its free rotation, is a small phonographic record with an advertising or publicity message of any kind, or it may be a greeting, congratulation, etc. This phonographic record rotates gradually by means of a pencil point or anything similar. To the wing which is disposed almost perpendicularly and in doubled form to the other vertical portion of the base which constitutes the principal body of the apparatus, is secured a phonograph needle which engages the engraved sound disc to reproduce the sound; the almost perpendicular wing acting as a sounding diaphragm.

From the foregoing, it is seen that it is a principal object of the invention to provide a speaking or sounding chart or card which through a simple manual operation may transmit music or a sounding message or both in combination, which message may be advertising or publicity, or greeting or congratulations, or the like.

These and other details, objects and characteristics of the sounding charts or cards of the invention, will be made clearly apparent in the course of the following description, and with reference to the accompanying drawings which illustrate the invention, like reference numerals indicating like parts throughout the several views.

Before describing in a detailed manner the charts or cards of the invention, I wish it to be understood perfectly well that the drawings illustrate only by way of example the preferred form for the practice of the invention which is not limited to the specific details that are illustrated and described. Therefore, variations or modifications could be employed as are thought necessary or convenient without departing from the principles and within the scope of the invention, and always within the scope of the claims at the end of the following specification.

Figure 1:
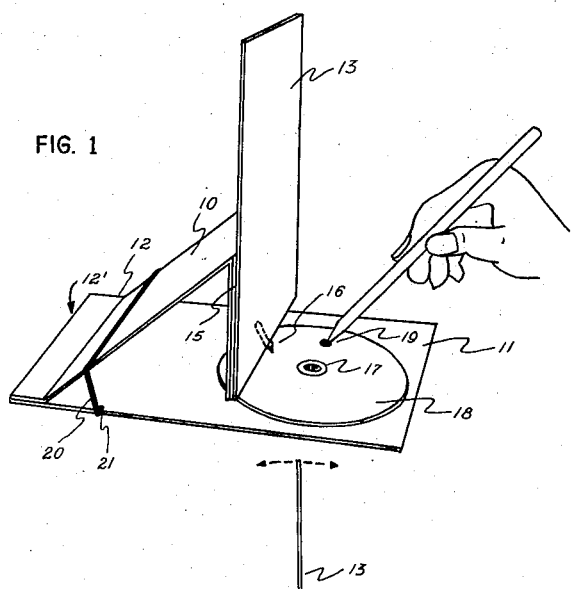
Fig. 1 shows a view in conventional perspective of a sounding chart made in accordance with the invention, and disposed in position to play or reproduce that which is engraved upon the disc, which rotates manually by means of a pencil or something similar, in the form indicated.

As is illustrated in the accompanying drawings, the device of the invention is constituted by a sheet or leaf of cardboard, pasteboard of the necessary strength, fibre, composition, or any other material that is thought convenient, bent or otherwise secured together at 12′ to form a hinged joint 12 between the portions 10 and 11. With the bend or hinged joint 12, these sheets or portions 10 and 11 will be susceptible to being confronted, one over the other as illustrated in Fig. 1 of the accompanying drawings. The part 10 constitutes the angular portion of the device, while 11 constitutes the base or supporting portion.

Figure 2:
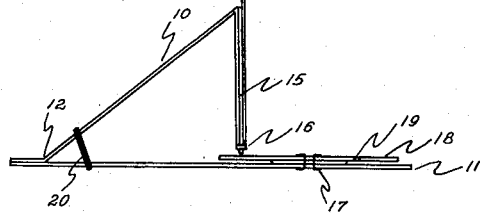
Fig. 2 shows a side elevation of the same sounding device which is illustrated by the previous figure.
Figure 3:
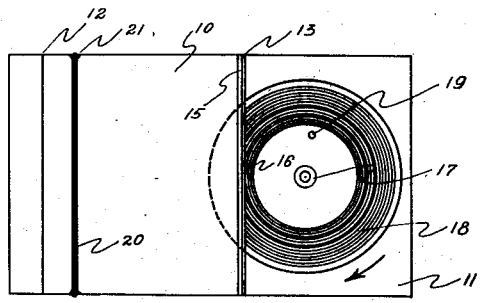
Fig. 3 is a plan view of the same device, indicating with an arrow the direction in which the small engraved record must gyrate.

On the forward side of the sheet or portion 10 there is secured a wing 13 which acts as a diaphragm in the functioning of the device, and this wing 13 is firmly hinged to the same for radial movement, as is illustrated by an arrow in Fig. 2 of the accompanying drawings. This wing 13 is not hinged centrally to portion 10, but, as is illustrated in Figs. 1 and 3, of the drawings, is hinged closer to the lower edge of the wing 13 than to its upper edge. In operative position this wing 13 is in an upstanding position with respect to the portion 11 and said wing 13 is strengthened by a strip 15 to facilitate the fastening of an inclined phonograph needle 16, and to help amplify the sounds, since said wing 13 and its strengthening strip 15 act as the sounding diaphragm.

On the portion 11 which acts as a base of the device, fastened so that it will gyrate on a swivel 17, is a phonograph record 18, which consists of a small disc of plastic material or of any other material usually employed for this class of article, with a message engraved upon it, so that it constitutes an advertisement, a greeting, a song, a musical piece, etc. The swivel 17 on which the disc 18 revolves on the portion 11, may be a rivet or an eyelet as is illustrated in the accompanying drawings. The phonographic record 18 will have, near the center of the central portion, where the threads of the engraving terminate, a small dent or perforation 19 into which may be introduced the point of a pencil, a stick or anything similar, to cause the movement of rotation which the disc requires.

To sustain the apparatus in position when the diaphragm wing 13 is placed in the correct upstanding position, a spring 20 is provided, such as an elastic band or something similar, that will enter in the notches 21 (Figs. 1 and 3 of the drawings) that are made in the corresponding edges of the portion 10 and of the portion 11.

To make the apparatus operate, portions 10 and 11 are opened at an angle and the wing 13 is also placed in an upstanding position relative to the portion 11, and at an angular position with respect to portion 10, so that the point of the needle 16 which it carries enters the first groove of the recording of the record 18. Then the point of a pencil, the end of a holder or anything similar is inserted in the dent or perforation 19 of the record, and this is pushed to make it revolve at the convenient number of revolutions per minute that the ear itself will indicate as correct, and there the message, music or song recorded on the record will begin to be clearly heard, since the wing 13 with its reinforcement 15, will act as an amplifying diaphragm of the sounds picked up by the needle from the grooves engraved on the disc. Very little practice will be required to make the engraved record turn at the proper velocity.

What I claim is:

1. In a foldable phonographic device comprising a card member having a flat base section, a flat angular section hinged at an end portion to an end portion of the base section, and a flat wing section hingedly secured intermediate its ends to the free end portion of the angular section so that said sections will normally lie flatwise one upon the other and said wing section will have a swinging movement relative to the base section and a rocking movement on the angular section and may be operatively stood in an angular position with respect to each of said other sections, a phonograph needle fastened in the lower edge portion of the wing section, a phonograph record disc having a circular sound track rotatably mounted on the base section, and manual means for rotating the record with the needle engaged in the sound track to thereby vibrate the wing section for the production of audible sound waves.

2. In a foldable phonographic device comprising a cardboard sheet bent upon itself to form a base portion and an angular portion, a wing hingedly secured intermediate its ends to the free end of the angular portion so that said wing has a rocking movement thereon and may be stood in an angular position with respect to each of said portions, a phonograph needle fastened to the lower edge portion of the wing, a phonograph record disc having an engraved circular sound track mounted upon the base portion for rotatory movement thereupon, and means for manually rotating the record when the needle is engaged in the sound track of the record to vibrate the wing for the production of audible sound waves.

3. In a foldable phonographic device constructed from cardboard comprising a flat base section, a flat angular section hinged at an end portion to an end portion of the base section, and a flat wing section hingedly secured to the angular section so that said sections will normally lie flatwise one upon the other and said wing section will have a swinging movement relative to the base section and may be operatively stood in an angular position with respect to each of said other sections, a phonographic needle fastened in the lower edge portion of the wing section, a phonograph record disc having a circular sound track rotatably mounted on the base section, and manual means for rotating the record with the needle engaged in the sound track to thereby vibrate the wing section for the production of audible sound waves.

4. In a foldable phonographic device comprising a card member having a flat base section, a flat angular section hinged at an end portion to an end portion of the base section, and a flat wing section hingedly secured intermediate its ends to the free end portion of the angular section so that said sections will normally lie flatwise one upon the other and said wing section will have a swinging movement relative to the base section and a rocking movement on the angular section and may be operatively stood in an angular position with respect to each of said other sections, a phonograph needle fastened in the lower edge portion of the wing section, a phonograph record disc having a circular sound track directly mounted for rotation on the base section, and manual means for rotating the record with the needle engaged in the sound track to thereby vibrate the wing section for the production of audible sound waves.

References Cited in the file of this patent

UNITED STATES PATENTS

| | | |
|---|---|---|
| 1,817,477 | Buckle | Aug. 4, 1931 |
| 2,183,777 | Schwartz | Dec. 19, 1939 |
| 2,523,340 | Bonsall | Sept. 26, 1950 |
| 2,635,883 | Ponticello | Apr. 21, 1953 |

FOREIGN PATENTS

| | | |
|---|---|---|
| 419,324 | Great Britain | Nov. 9, 1934 |
| 276,764 | Switzerland | July 31, 1951 |